United States Patent [19]
Boehland, Jr.

[11] 3,780,703
[45] Dec. 25, 1973

[54] BIRD FEEDER
[75] Inventor: Robert R. Boehland, Jr., Lynn, Wis.
[73] Assignee: Feather Hill Industries, Inc., Zenda, Wis.
[22] Filed: June 23, 1972
[21] Appl. No.: 265,470

[52] U.S. Cl. ................................................ 119/53
[51] Int. Cl. ............................................ A01k 5/00
[58] Field of Search ........................... 119/53, 52 R

[56] References Cited
UNITED STATES PATENTS

| 940,540 | 11/1909 | Loop et al. | 119/53 |
| 2,866,435 | 12/1958 | Blazier | 119/53 |
| 609,755 | 8/1898 | Chapin | 119/53 X |
| 517,101 | 3/1894 | Haigler | 119/53 |
| D165,628 | 1/1952 | Blazier | 119/53 X |
| 2,705,938 | 4/1955 | Greenough | 119/52 R |

FOREIGN PATENTS OR APPLICATIONS

| 408,264 | 1/1925 | Germany | 119/53 |

Primary Examiner—Louis G. Mancene
Assistant Examiner—J. A. Oliff
Attorney—C. Frederick Leydig et al.

[57] ABSTRACT

A bird feeder includes a transparent reservoir for storing a large quantity of feed for the birds to see so that more birds are attracted to the feeder. Orifices communicating with the reservoir are adjustable between open and closed positions to regulate the gravity flow of feed onto a tray located below the reservoir in order to maintain a limited but adequate amount of feed for the birds to eat.

10 Claims, 6 Drawing Figures

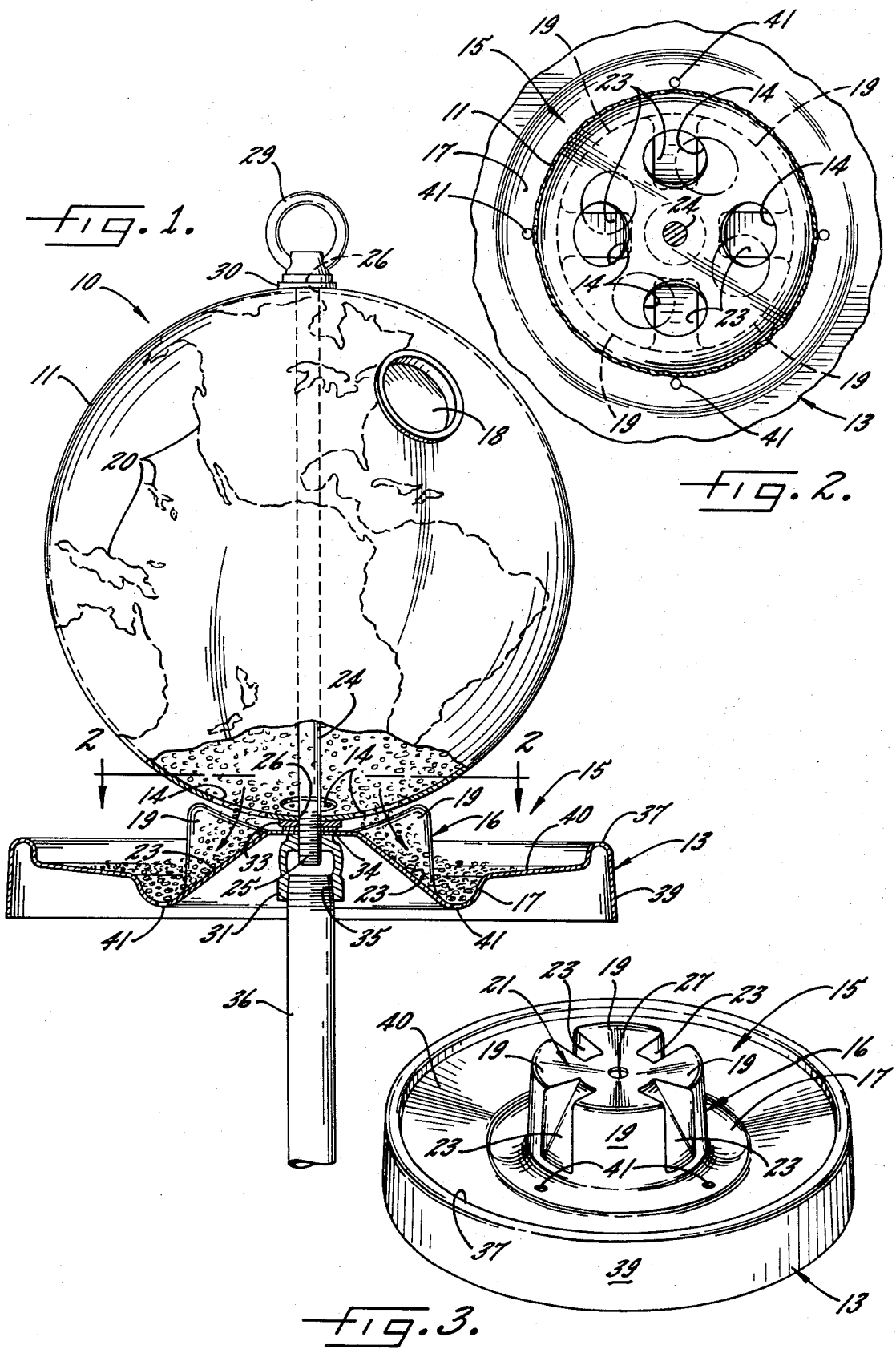

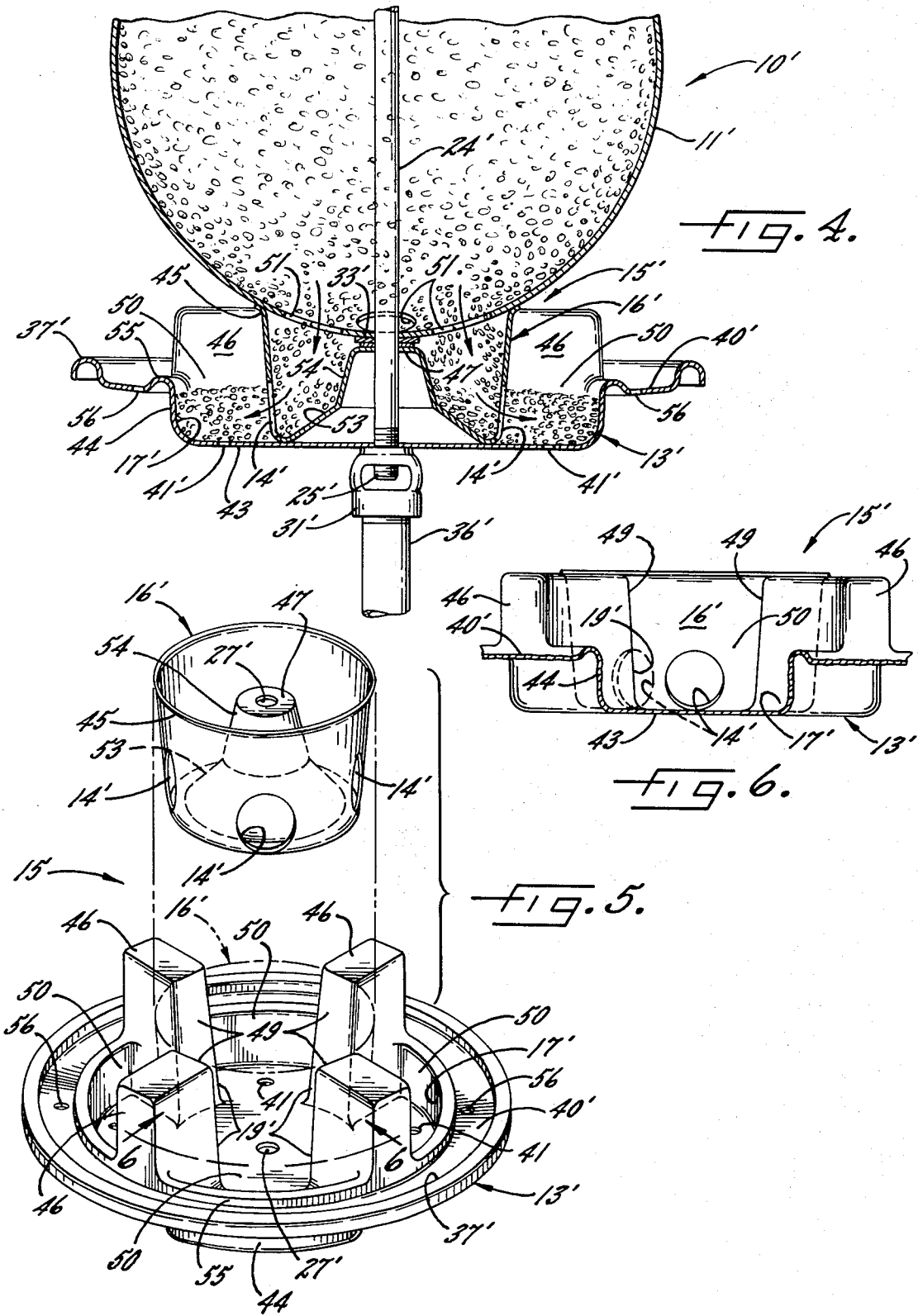

BIRD FEEDER

BACKGROUND OF THE INVENTION

This invention relates generally to a bird feeder and, more particularly, to the type of feeder within which a large supply of feed may be stored for feeding to the birds.

SUMMARY OF THE INVENTION

The general object of the present invention is to provide a new and improved bird feeder of the above general character which attracts birds much better than the prior feeders. A more detailed object is to accomplish the foregoing through the provision of a feeder having transparent parts so that the birds can see easily the large supply of feed stored in the feeder and as a result are attracted to the feeder. In addition, provision is made for helping to further attract birds to the feeder by constructing the feeder in a novel manner so to reflect sunlight in an irregular manner to draw the attention of birds to the feed in the reservoir.

A still further object is to provide in the feeder a novel arrangement for metering out the stored feed in a limited but adequate amount for the birds to eat.

The invention also resides in the unique structure employed to regulate the flow of feed from the supply for the birds to eat and in the novel arrangement of parts of the feeder to insulate the feed in the reservoir against wind.

These and other objects and advantages of the present invention will become more apparent from the following detailed description when taken in conjunction with the accompanying drawings.

BRIEF DESCRIPTION OF THE DRAWINGS

FIG. 1 is an elevational view of a bird feeder embodying the novel features of the present invention with parts of the feeder broken away and shown in cross section.

FIG. 2 is a fragmentary cross-sectional view taken substantially along line 2—2 of FIG. 1.

FIG. 3 is a perspective view of a part of the bird feeder.

FIG. 4 is a fragmentary elevational view showing parts of an alternative embodiment of the feeder in a cross-sectional view similar to FIG. 1.

FIG. 5 is an exploded perspective view of parts of the alternative embodiment.

FIG. 6 is a cross-sectional view taken substantially along line 6—6 of FIG. 5 showing parts of the feeder telescoped together.

DETAILED DESCRIPTION OF THE PREFERRED EMBODIMENTS

As shown in the drawings for purposes of illustration, the present invention is embodied in a bird feeder 10 uniquely constructed to attract more birds than prior feeders of the same general type. In carrying out this aspect of the invention, the feeder includes a transparent reservoir 11 supported above a tray 13 for the storage of bird feed. Because a large supply of feed within the reservoir may be seen by the birds, a greater number of birds are attracted to the feeder. Yet, while the supply of feed may be seen by the birds, only a limited but adequate amount of feed is accessible for the birds to eat owing to the unique provision of plurality of adjustable orifices 14 communicating with the interior of the reservoir. In use, means 15 on the tray cooperate with the orifices so that the latter may be adjusted between fully open and closed positions to regulate the amount of feed permitted to flow out of the reservoir and onto the tray.

In the present instance, the reservoir 11 is mounted on the upper end of a support 16 projecting upwardly from the center of the tray 13. The orifices 14 permit the feed contained in the reservoir to flow by gravity from the reservoir and into a trough 17 formed in the tray around the base of the support. The regulating means 15 includes a plurality of gates 19, each one of the gates being associated with one of said orifices and moveable relative to its associated orifice to partially block the flow of feed through the orifice in order to keep a selected amount of feed on the tray. Thus, as the feed is eaten from the trough, new feed from the reservoir continually flows into the trough to keep a regulated amount of feed on the tray for the birds to eat.

As shown in FIGS. 1 through 6, the reservoir 11 is molded in the shape of a hollow globe of clear plastic. Embossing 20 represented by the outlines of continents and islands on the surface of the globe 11 irregularly reflects sunlight from the surface to draw the attention of birds to the feed in the globe. Thus, the embossing further helps attract birds to the feeder.

In the exemplary embodiment shown in FIGS. 1, 2 and 3, a removable plastic plug 18 in the top of the globe 11 covers a hole (not shown) for filling the globe with feed and the orifices 14 are formed in the bottom of the globe 11 adjacent the upper end of the support 16. The latter is molded integrally with the plastic tray as a generally frustoconical column, the upper end thereof defining a curved socket 21 receiving the globe. More particularly, four orifices 14 are spaced angularly from each other around a vertical axis extending through the globe. The flow regulating means 15 includes four similarly spaced chutes 23 extending upwardly and inwardly through the column between the trough 17 and the socket. Control over the amount of feed flowing into the trough is maintained by turning the globe about its vertical axis to misalign the orifices with their associated chutes. When this is done, the portions of the socket which extend between the chutes and the gates 19 partially block the orifices to restrict the flow of feed down the chutes and into the trough. As shown in FIG. 2, the globe may be turned either clockwise or counterclockwise to move the orifices between fully open positions with opposite ends of the orifices overlapping adjacent gates and closed positions (not shown). By adjusting the globe to position the orifices with the gates partially blocking the flow of feed by gravity down the chutes, the amount of feed allowed to flow into the trough 17 can be regulated so that the entire supply of feed can be metered out over an extended period of time for the birds to eat.

To hold the globe 11 within the socket 21 while still permitting the globe to be turned about its vertical axis, the globe is secured to the column 16 by means of an elongated metal rod 24. The latter extends through both the globe and the column and includes a threaded lower end 25 projecting downwardly beneath the tray. Aligned holes 26 in the top and bottom of the globe along the vertical axis of the latter and an associated hole 27 in the column at the center of the socket 21 receive the rod. A ring 29 integrally formed with the upper end of the rod engages a flexible washer 30 surrounding the rod between the ring and the top of the globe and coacts with a pipe fitting 31 threaded on the lower end of the rod to hold the globe in the socket. A second flexible washer 33 around the rod at the bottom of the globe supports the globe slightly above the surface of the socket and a metal washer 34 below the lower washer 33 permits the globe to be turned relatively easily on the rod, yet without turning freely, Thus, with this arrangement, the globe can be turned on the rod to orient the orifices 14 relative to the gates 19 without the globe slipping out of the desired position.

Conveniently, the ring 29 may be used to hang the bird feeder 10 by a cord (not shown) such as from the lower limb of a tree. In addition, internal threads 35 of the fitting permit the feeder to be mounted on the top of a pipe 36. With either of these mounting arrangements, the feeder may be placed out of the reach of animals likely to steal the bird feed.

In the feeder 10 of the present invention, it will be appreciated that the relative positioning between the orifices 14 and the gates 19 for maintaining the desired amount of feed in the trough 17 depends in large upon the flowability of the type of bird feed being used. It has been found that, with orifices having a diameter on the order of one inch, feed comprised mainly of sunflower seeds will flow through the orifices and maintain an adequate amount of the seed on the tray when the globe 11 is turned so that the gates block flow through approximately two-thirds of each of the orifices (see FIG. 2). Other gate settings may be required for other feed grain mixtures, depending upon the amount of feed one desires to keep in the trough.

While feeding, the birds may perch upon a peripheral ridge 37 (FIG. 1) molded in the tray 13 at the upper end of a depending skirt 39 extending around the tray. The ridge is disposed below the top of the column 16 a distance of about one half inch which herein approximates one-third of the distance between the top of the column and the bottom of the trough 17. By virtue of its spherical shape, the globe 11 advantageously limits the size of birds capable of eating from the trough. In the exemplary feeder 10, an 8 inch diameter globe is supported on a tray which is approximately 10 inches in diameter and overhangs the trough and ridge enough to keep birds larger than the approximate size of an adult cardinal from eating feed in the trough. Thus, only the more desirable birds such as cardinals and other smaller birds can eat the feed on the tray.

As shown in FIG. 1, extending between the ridge 37 and the trough 17 is an annular shelf 40 which slants downwardly from the ridge upon progressing inwardly toward the trough. The shelf guides rain water into the trough and the water drains through openings 41 located in the bottom of the trough to avoid damage to the feed located in the trough.

Under some climatic conditions, it is desirable to insulate the globe 11 from the wind and especially when fine grain feed is stored in the globe. In the alternative embodiment illustrated in FIGS. 4, 5 and 6, the feed is insulated from the wind by constructing the regulating means 15' so that the feed remains protected until it flows into the trough 17' from below the level of the ridge 37'. To this end, the support 16' is defined by a cup disposed within a central depression 43 in the tray 13', the orifices 14' in this form of the invention being formed in the side of the cup 16' and the trough being defined by the space between the sides of the cup and an upright wall 44 surrounding the depression. With this arrangement, the orifices are located below the level of the ridge so that the wind virtually is prevented from blowing horizontally through the orifices and into the globe to swirl the feed in the interior of the globe.

As shown in FIG. 4, the cup 16 opens upwardly from the center of the depression 43 to receive the feed from the globe 11' as the latter rests on the upper rim 45 of the cup. To meter the flow of feed into the trough 17', the regulating means 15 in this embodiment includes four bosses 46 projecting into the depression and a truncated cone 47 which projects upwardly from the center of the cup. The bosses serve as the gates 19' to block the flow of feed through the orifices, the cup being rotatable about the vertical axis of the globe to move the orifices into selected positions in front of the bosses. More particularly, the bosses are molded integrally with the tray, being formed as generally rectangular blocks projecting both radially toward the center of the depression and upwardly beyond the height of the peripheral ridge 37' of the tray from angularly spaced positions along the wall 44. The radially inward or front surfaces 49 of the bosses engage the outer surface of the cup to captivate the cup on the tray within the depression and also serve as the gates to block the flow of feed through the orifices. In addition, the bosses separate the trough into four arcuate segments or pockets 50 which receive the metered feed so that the feeder is made even more wind proof by blocking wind which otherwise might blow feed out of the trough.

When the feeder 10' is being used, the cone 47 guides the feed flowing into the cup 16' outwardly through the orifices 14, the feed entering the cup through holes 51 in the bottom of the globe 11'. In this embodiment, the holes are in the globe merely to permit the feed to flow from the globe toward the metering orifices in the cup. As shown in FIGS. 4 and 5, the cone comprises two generally frustoconical sections, a lower section 53 with an outer surface having a relatively low incline with respect to the horizontal and an upper section 54 integral with the lower section and having an outer surface inclined at a relatively steep angle with respect to the horizontal. Thus as the feed flows from the globe, through the holes and into the cup, the cone guides the feed to the four orifices to help meter the feed in equal amounts into the pockets 50 forming the trough 17'.

As in the first embodiment, once the feed is in the trough 17', birds may perch on the peripheral ridge 37' to reach the feed in the trough. To keep feed from being spilled out of the trough and onto the shelf 40', a rib 55 is formed around the inner edge of the shelf along the top of the wall 44. Drain holes 56 spaced along the rib in the shelf keep rain water from flowing into the trough and, with the globe 11 overhanging the trough, the feed in the trough is better protected against dampness. In addition, the drain holes 41' in the trough provide exits for water which possibly may collect in the trough.

I claim as my invention:

1. A bird feeder for metering out feed from a self-contained supply of feed comprising a tray having a peripheral ridge, a frustoconical column projecting upwardly from the center of the tray beyond the height of said ridge, a feed trough formed around the base of the column, an annular shelf extending between the ridge and the trough and slanting downwardly from said ridge upon progressing inwardly toward said trough, a socket formed in the upper end of said column and a predetermined number of angularly spaced chutes extending through said column upwardly and inwardly from said trough into said socket, a transparent and hollow globe mounted in socket above said tray to hold the supply of feed, an upper opening in the globe to permit feed to be dumped into the globe, a plurality of angularly spaced lower orifices formed in said globe and equal to the number of chutes, an elongated rod extending vertically through said globe and said column and connecting to the tray to support said globe for turning about the central axis of said rod to move said orifices relative to said column selectively between fully open positions with said orifices aligned with said chutes and closed positions with the upper end of the column blocking the orifices thereby to regulate the flow of feed through the orifices, down the chutes and into the trough to maintain a selected amount of feed on the tray for the birds to eat.

2. A bird feeder for metering out feed from a self-contained supply of feed comprising a tray, a reservoir for containing said supply, means holding said tray and said reservoir together, an upwardly opening trough formed in said tray and extending around the center portion thereof, an orifice communicating with the interior of said reservoir to permit feed from said supply to flow by gravity into said trough, and means to regulate selectively the flow of feed into said trough including a gate integrally formed with said tray and movable relative to said orifice to adjust the orifice selectively between a closed position with the gate blocking the flow of feed through the orifice and a fully open position permitting the free flow of feed into the trough, a support projecting upwardly from the center portion of the tray to support said reservoir above said tray and a guide surface formed in said support and slanting upwardly and inwardly from said trough to the upper end of said support so said gate and said support coact to regulate selectively the flow of feed from the reservoir and into the trough in order to maintain a selected amount of feed in the trough for the birds to eat.

3. A bird feeder as defined by claim 2 wherein said reservoir is transparent to hold the feed supply in full view to help attract birds to the feeder, embossing formed on the surface of said reservoir and adapted to reflect sunlight in an irregular manner also to help attract birds to the feeder.

4. A bird feeder as defined by claim 2 wherein said support includes a column integrally formed with and projecting upwardly from the center portion of the tray, said guide surface being defined by a chute extending through said column upwardly and inwardly from said trough to the upper end of said column, said gate being defined by the upper end portion of said column adjacent said chute, said orifice being formed in said reservoir adjacent the upper end of said column, and said holding means permitting said reservoir to be turned on said column about a vertical axis extending through said reservoir and said column to move said orifice between said fully open position with the orifice aligned with said chute and said closed position.

5. A bird feeder as defined by claim 4 wherein said trough extends entirely around the base of said column, said regulating means further including a plurality of said chutes angularly spaced around said column, a plurality of said orifices formed in said reservoir, said orifices being equal in number to the number of chutes and angularly spaced from each other a distance equal to the distance between said chutes, a plurality of said gates being defined by the portions of the upper end of said column between said chutes.

6. A bird feeder as defined by claim 5 wherein said holding means includes an elongated rod extending vertically through said reservoir and said column and connecting to said tray to support the reservoir for turning about the central axis of said rod to move said orifices relative to said gates selectively between fully open positions with said orifices aligned with said chutes and closed positions with the gates each blocking an associated one of the orifices thereby to regulate the flow of feed through the orifices.

7. A bird feeder as defined by claim 2 wherein said tray includes a central depression, a generally upright wall surrounding said depression, a plurality of bosses projecting into said depression from angularly spaced positions along said wall, said support including a cup located in said depression and captivated between said bosses against transverse movement relative to said tray and having an upper rim supporting said reservoir above said depression, a hole through said reservoir communicating between the interior of said reservoir and said cup, said trough being defined by the space between the sides of said cup and said wall, said orifice being formed through the side of said cup and opening into said trough, a cone integrally formed with and extending upwardly from the bottom of said cup, the outer surface of said cone defining said guide surface and serving to deflect feed flowing into the cup outwardly through the orifice and into said trough and one of said bosses defining said gate.

8. A bird feeder as defined by claim 7 wherein said bosses divide said trough into a plurality of arcuate segments extending between adjacent pairs of bosses, a plurality of said orifices being formed through the sides of said cup, said orifices being equal in number to the number of said bosses and angularly spaced from each other a distance equal to the distance between said bosses, each of said bosses serving as one of said gates.

9. A bird feeder as defined by claim 8 including an elongated rod extending vertically through said reservoir, cup and tray and connecting to said tray to support the cup for turning about the central axis of said rod to move said orifices relative to said gates selectively between fully open positions with said orifices opening into said trough segments and closed positions with said gates blocking the orifices thereby to regulate the flow of feed through the orifices.

10. A bird feeder for metering out feed from a self-contained supply of feed comprising a tray having a peripheral ridge, an inner ridge spaced inwardly of said peripheral ridge, an annular shelf extending between said ridges and slanting downwardly upon progressing inwardly toward said inner ridge, a central depression, a generally upright wall extending between said inner ridge and the bottom of said depression, a plurality of generally rectangular bosses integrally formed with said wall and with the bottom of said depression, said bosses being angularly spaced from each other and extending in a horizontal direction generally radially toward the center of said depression and projecting upwardly beyond the height of said peripheral ridge, a cup located in said depression and captivated between the inner radial ends of said bosses against transverse movement relative to said tray, a feed trough defined by the space between the sides of the cup and said wall and being formed of a plurality of arcuate segments extending between adjacent pairs of bosses, a plurality of orifices formed through the sides of said cup and angularly spaced from each other a distance equal to the distance between said bosses, a truncated cone extending upwardly from the bottom of said cup, a transparent and hollow globe mounted on the rim of said cup to hold the supply of feed, an upper opening in the globe to permit the feed supply to be dumped into the globe, a plurality of angularly spaced holes formed through said globe to communicate with said cup adjacent the upper end of said cone whereby feed may flow by gravity through said holes and into said cup against said cone to be deflected thereby through said orifices and into the trough, and an elongated rod extending vertically through said globe, cup and tray and connecting to the bottom of said tray to support the cup for turning about the central axis of said rod to move said orifices relative to said bosses selectively between fully open positions with said orifices opening into said segments and closed positions with the bosses blocking the orifices thereby to regulate the flow of feed into the separate segments of the trough to maintain a selected amount of feed on the tray for the birds to eat.

* * * * *